US012634806B2

(12) United States Patent
Jeon et al.

(10) Patent No.: US 12,634,806 B2
(45) Date of Patent: *May 19, 2026

(54) METHOD AND APPARATUS FOR NETWORK PARAMETER ADAPTATION

(71) Applicant: Samsung Electronics Co., Ltd., Suwon-si (KR)

(72) Inventors: Jeongho Jeon, San Jose, CA (US); Aristides Papasakellariou, Houston, TX (US); Hongbo Si, Allen, TX (US); Ebrahim MolavianJazi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

This patent is subject to a terminal disclaimer.

(21) Appl. No.: 18/353,792

(22) Filed: Jul. 17, 2023

(65) Prior Publication Data

US 2024/0040485 A1 Feb. 1, 2024

Related U.S. Application Data

(60) Provisional application No. 63/394,163, filed on Aug. 1, 2022.

(51) Int. Cl.
*H04W 48/12* (2009.01)
*H04W 72/232* (2023.01)

(52) U.S. Cl.
CPC ......... *H04W 48/12* (2013.01); *H04W 72/232* (2023.01)

(58) Field of Classification Search
CPC ........................... H04W 48/12; H04W 72/232
See application file for complete search history.

(56) References Cited

U.S. PATENT DOCUMENTS

| | | | |
|---|---|---|---|
| 2020/0029315 A1 | 1/2020 | Lin et al. | |
| 2021/0235469 A1 | 7/2021 | Mu | |
| 2021/0368368 A1 | 11/2021 | He et al. | |
| 2022/0240284 A1 | 7/2022 | Zhou et al. | |
| 2023/0284205 A1* | 9/2023 | Nory | H04W 72/232 |
| | | | 370/329 |
| 2024/0040586 A1* | 2/2024 | Jeon | H04L 5/001 |

(Continued)

FOREIGN PATENT DOCUMENTS

| | | |
|---|---|---|
| CN | 109417762 A | 3/2019 |
| CN | 114696970 A | 7/2022 |

(Continued)

OTHER PUBLICATIONS

International Search Report and Written Opinion issued Oct. 31, 2023 regarding International Application No. PCT/KR2023/011040, 7 pages.

(Continued)

*Primary Examiner* — Michael J Moore, Jr.

(57) ABSTRACT

Network parameter adaptation in a wireless communication system. A method for a user equipment (UE) includes receiving first information related to operation states on a cell and second information related to a search space set to receive physical downlink control channels (PDCCHs). A first operation state from the operation states includes first parameters associated with transmissions of channels or signals on the cell in one or more of a power, spatial, time, or frequency domain. A PDCCH from the PDCCHs provides a downlink control information (DCI) format that indicates one or more of the operation states. The method further includes receiving the PDCCH; determining the parameters in the one or more of the power, spatial, time, or frequency domain based on the one or more operation states indicated by the DCI format; and receiving the channels or signals on the cell based on the parameters.

20 Claims, 11 Drawing Sheets

(56)                References Cited

U.S. PATENT DOCUMENTS

| | | | |
|---|---|---|---|
| 2024/0049250 A1* | 2/2024 | Cozzo ................... | H04L 5/0053 |
| 2024/0056152 A1* | 2/2024 | Jeon ..................... | H04B 7/0626 |
| 2024/0080859 A1* | 3/2024 | Shubhi ................. | H04W 76/28 |
| 2025/0056561 A1* | 2/2025 | Cozzo ................... | H04L 5/0098 |
| 2025/0063629 A1* | 2/2025 | Jeon ..................... | H04W 76/27 |

FOREIGN PATENT DOCUMENTS

| | | |
|---|---|---|
| EP | 4271051 A1 | 11/2023 |
| KR | 10-2021-0021538 A | 2/2021 |

OTHER PUBLICATIONS

"3rd Generation Partnership Project; Technical Specification Group Radio Access Network; NR; Physical channels and modulatio(Release 17)", 3GPP TS 38.211 V17.2.0, Jun. 2022, 136 pages. n "3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

Extended European Search Report issued Sep. 19, 2025 regarding Application No. 23850358.5, 11 pages.

* cited by examiner

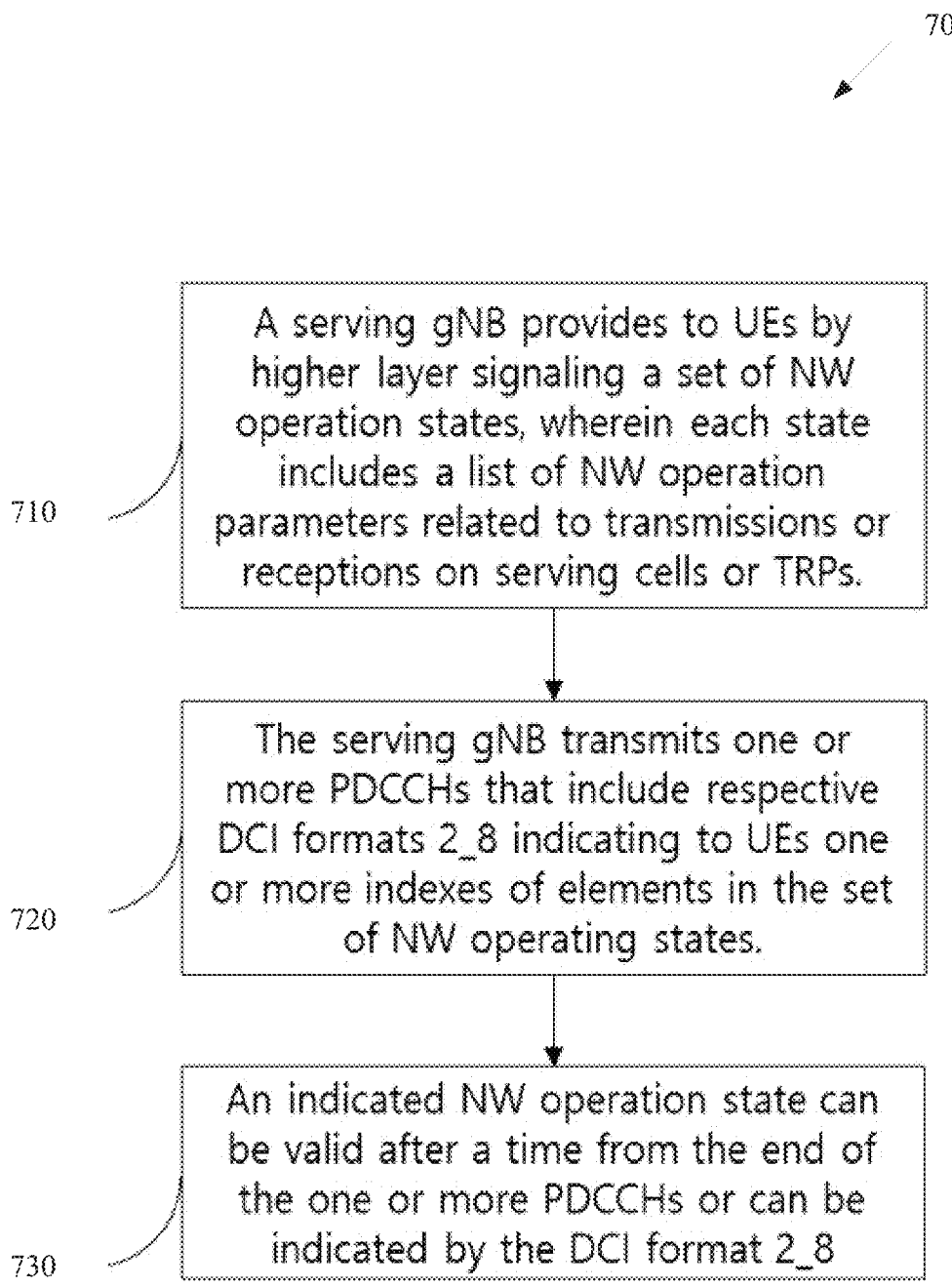

700

710　A serving gNB provides to UEs by higher layer signaling a set of NW operation states, wherein each state includes a list of NW operation parameters related to transmissions or receptions on serving cells or TRPs.

720　The serving gNB transmits one or more PDCCHs that include respective DCI formats 2_8 indicating to UEs one or more indexes of elements in the set of NW operating states.

730　An indicated NW operation state can be valid after a time from the end of the one or more PDCCHs or can be indicated by the DCI format 2_8

FIG. 7

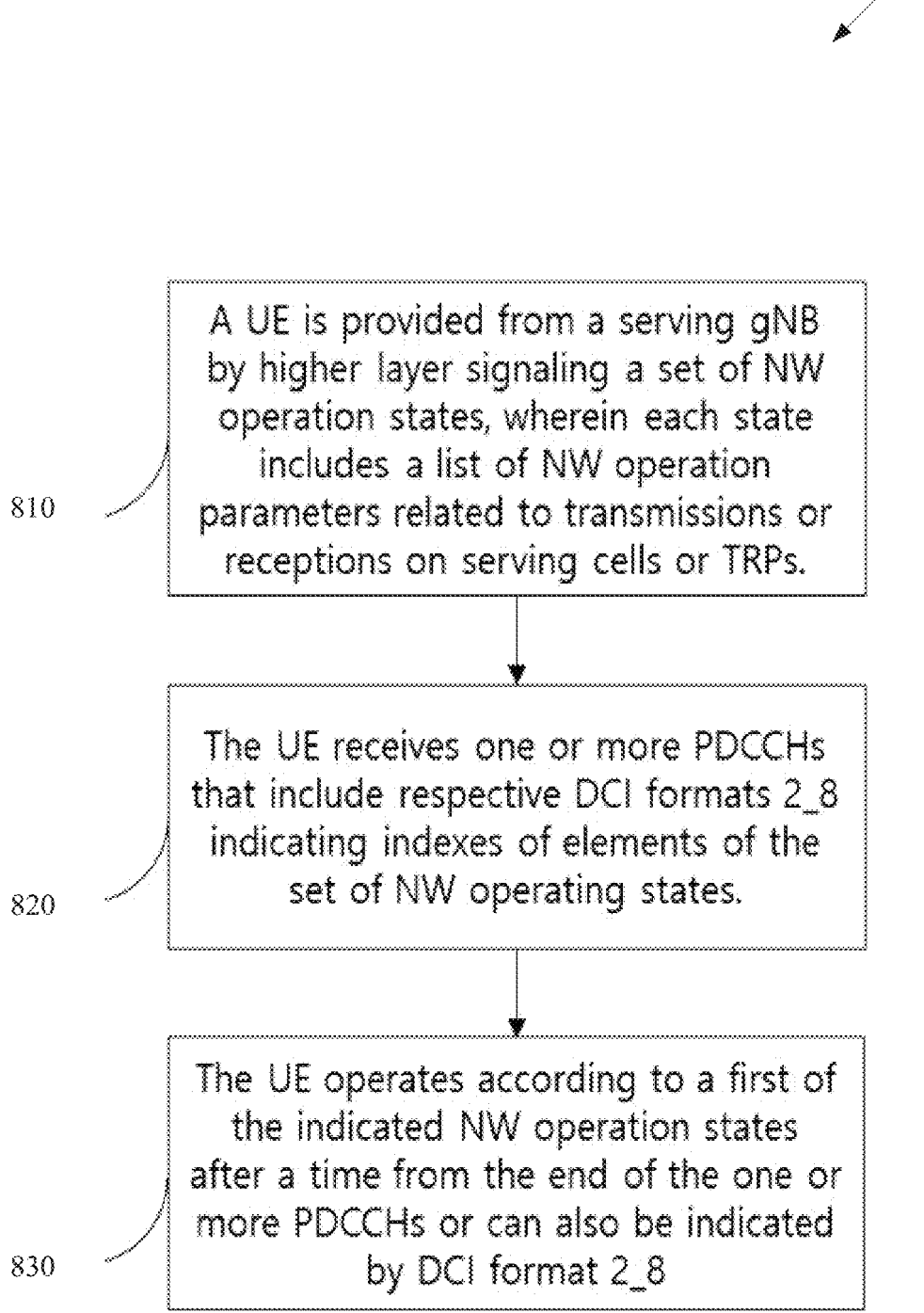

800

810 A UE is provided from a serving gNB by higher layer signaling a set of NW operation states, wherein each state includes a list of NW operation parameters related to transmissions or receptions on serving cells or TRPs.

820 The UE receives one or more PDCCHs that include respective DCI formats 2_8 indicating indexes of elements of the set of NW operating states.

830 The UE operates according to a first of the indicated NW operation states after a time from the end of the one or more PDCCHs or can also be indicated by DCI format 2_8

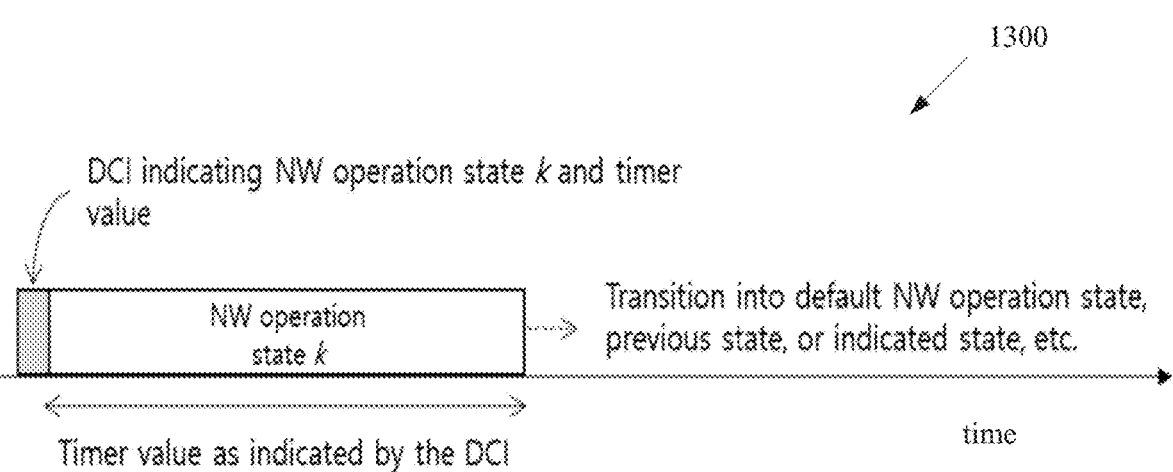

DCI indicating NW operation state *k* and timer value

| NW operation state *k* | Transition into default NW operation state, previous state, or indicated state, etc. |

Timer value as indicated by the DCI time

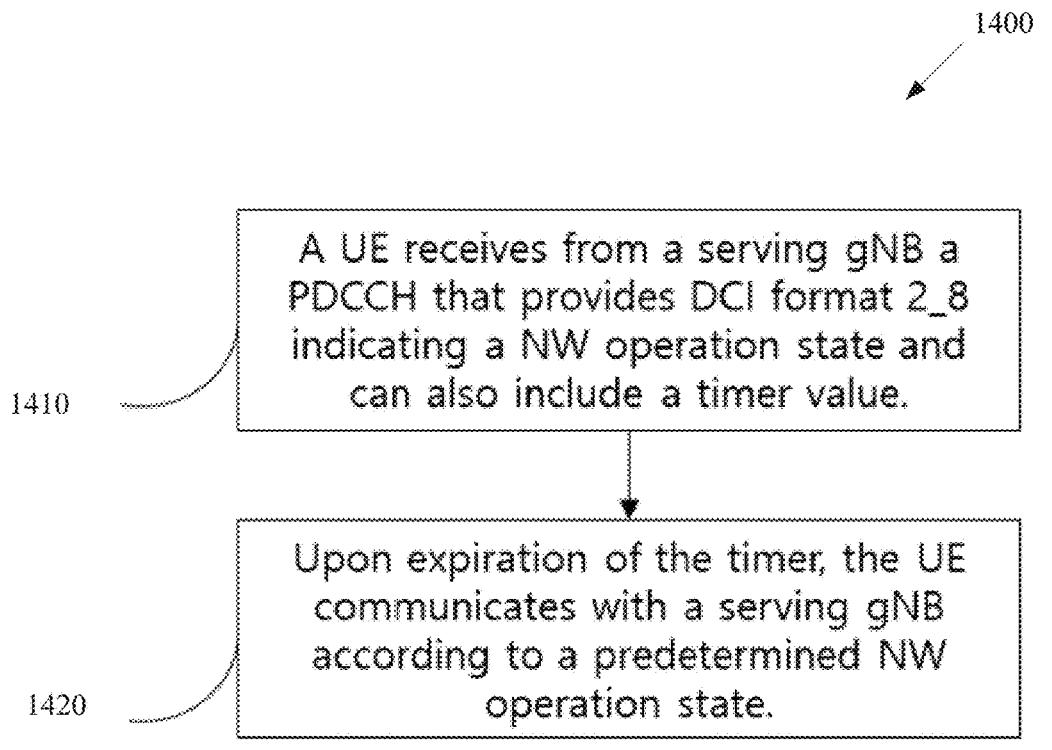

1410 — A UE receives from a serving gNB a PDCCH that provides DCI format 2_8 indicating a NW operation state and can also include a timer value.

1420 — Upon expiration of the timer, the UE communicates with a serving gNB according to a predetermined NW operation state.

METHOD AND APPARATUS FOR NETWORK PARAMETER ADAPTATION

CROSS-REFERENCE TO RELATED APPLICATIONS AND CLAIM OF PRIORITY

The present application claims priority to U.S. Provisional Patent Application No. 63/394,163, filed on Aug. 1, 2023. The contents of the above-identified patent documents are incorporated herein by reference.

TECHNICAL FIELD

The present disclosure relates generally to wireless communication systems and, more specifically, the present disclosure relates to network parameter adaptation in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to network parameter adaptation in a wireless communication system.

In one embodiment, a method for a user equipment (UE) is provided. The method includes receiving: first information related to operation states on a cell and second information related to a search space set to receive physical downlink control channels (PDCCHs). A first operation state from the operation states includes first parameters associated with transmissions of channels or signals on the cell in one or more of a power, spatial, time, or frequency domain. A PDCCH from the PDCCHs provides a downlink control information (DCI) format that indicates one or more of the operation states. The method further includes receiving the PDCCH; determining the parameters in the one or more of power, spatial, time, or frequency domain based on the one or more operation states indicated by the DCI format; and receiving the channels or signals on the cell based on the parameters.

In another embodiment, a UE is provided. The UE includes a transceiver configured to receive first information related to operation states on a cell, second information related to a search space set to receive physical downlink control channels (PDCCHs), and a PDCCH from the PDCCHs. The PDCCH provides a downlink control information (DCI) format that indicates one or more of the operation states. A first operation state from the operation states includes first parameters associated with transmissions of channels or signals on the cell in one or more of a power, spatial, time, or frequency domain. The UE further includes a processor operably coupled to the transceiver. The processor is configured to determine the parameters in the one or more of power, spatial, time, or frequency domain based on the one or more operation states indicated by the DCI format. The transceiver is further configured to receive the channels or signals on the cell based on the parameters.

In yet another embodiment, a base station is provided. The base station includes a transceiver configured to transmit first information related to operation states on a cell and second information related to a search space set to transmit physical downlink control channels (PDCCHs). A first operation state from the operation states includes first parameters associated with transmissions of channels or signals on the cell one or more of a power, spatial, time, or frequency domain. A PDCCH from the PDCCHs provides a DCI format that indicates one or more of the operation states. The base station further includes a processor operably coupled to the transceiver. The processor is configured to determine the parameters in the one or more of the power, spatial, time, or frequency domain. The transceiver is further configured to transmit the PDCCH with the DCI format indicating the one or more operation states and the channels or signals on the cell based on the parameters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates a flowchart of method for a NW to indicate and activate NW operation states according to embodiments of the present disclosure;

FIG. 8 illustrates a flowchart of method for UE to receive and activate NW operation states according to embodiments of the present disclosure;

FIG. 13 illustrates example of timing diagram of NW operation state transition according to this disclosure;

FIG. 14 illustrates a flowchart of method for a NW operation state transition based on a timer according to embodiments of the present disclosure;

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.2.0, "NR; Physical channels and modulation"; 3GPP TS 38.212 v17.2.0, "NR; Multiplexing and Channel coding"; 3GPP TS 38.213 v17.2.0, "NR; Physical Layer Procedures for Control"; 3GPP TS 38.214 v17.2.0, "NR; Physical Layer Procedures for Data"; 3GPP TS 38.321 v17.1.0, "NR; Medium Access Control (MAC) protocol specification" and 3GPP TS 38.331 v17.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
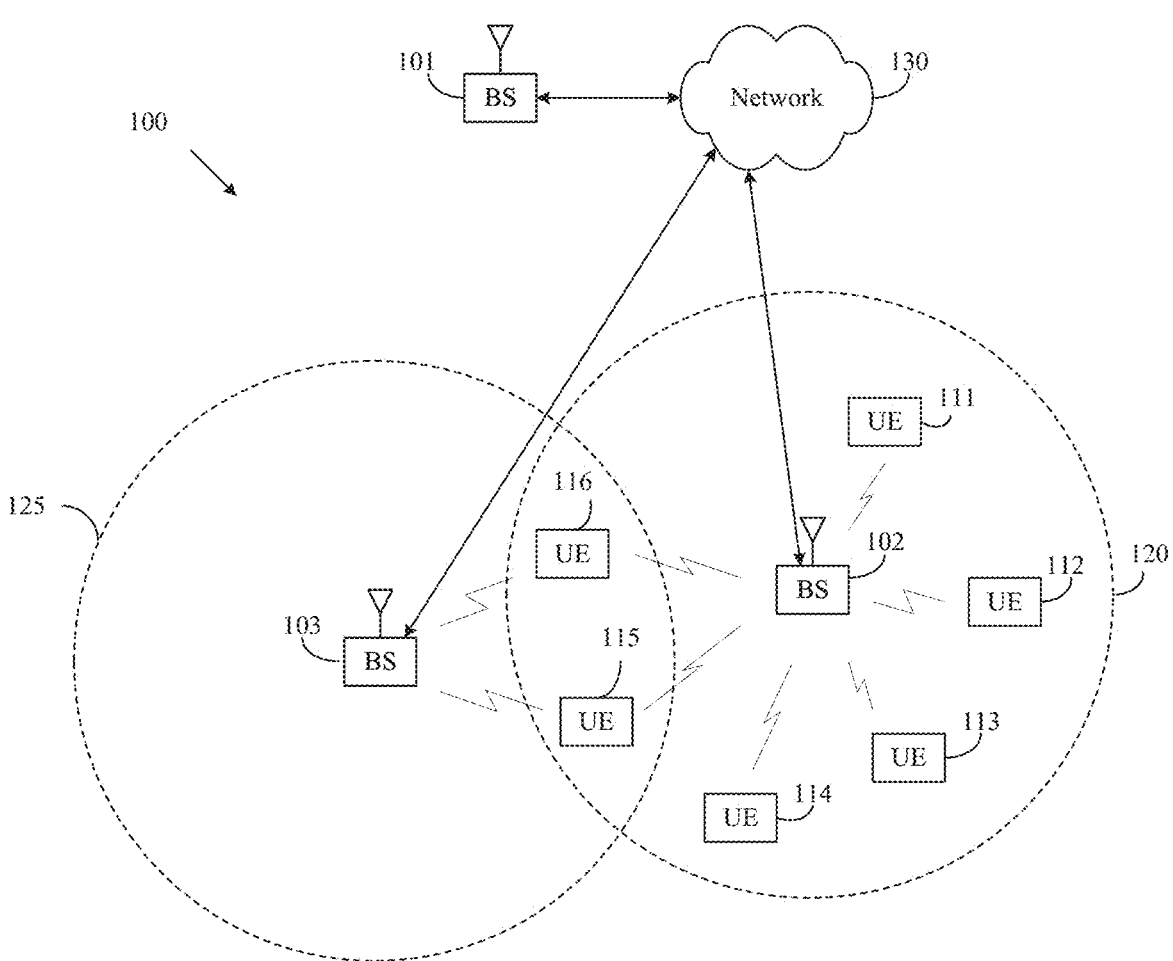
FIG. 1 illustrates an example of wireless network according to embodiments of the present disclosure.
Figure 2:
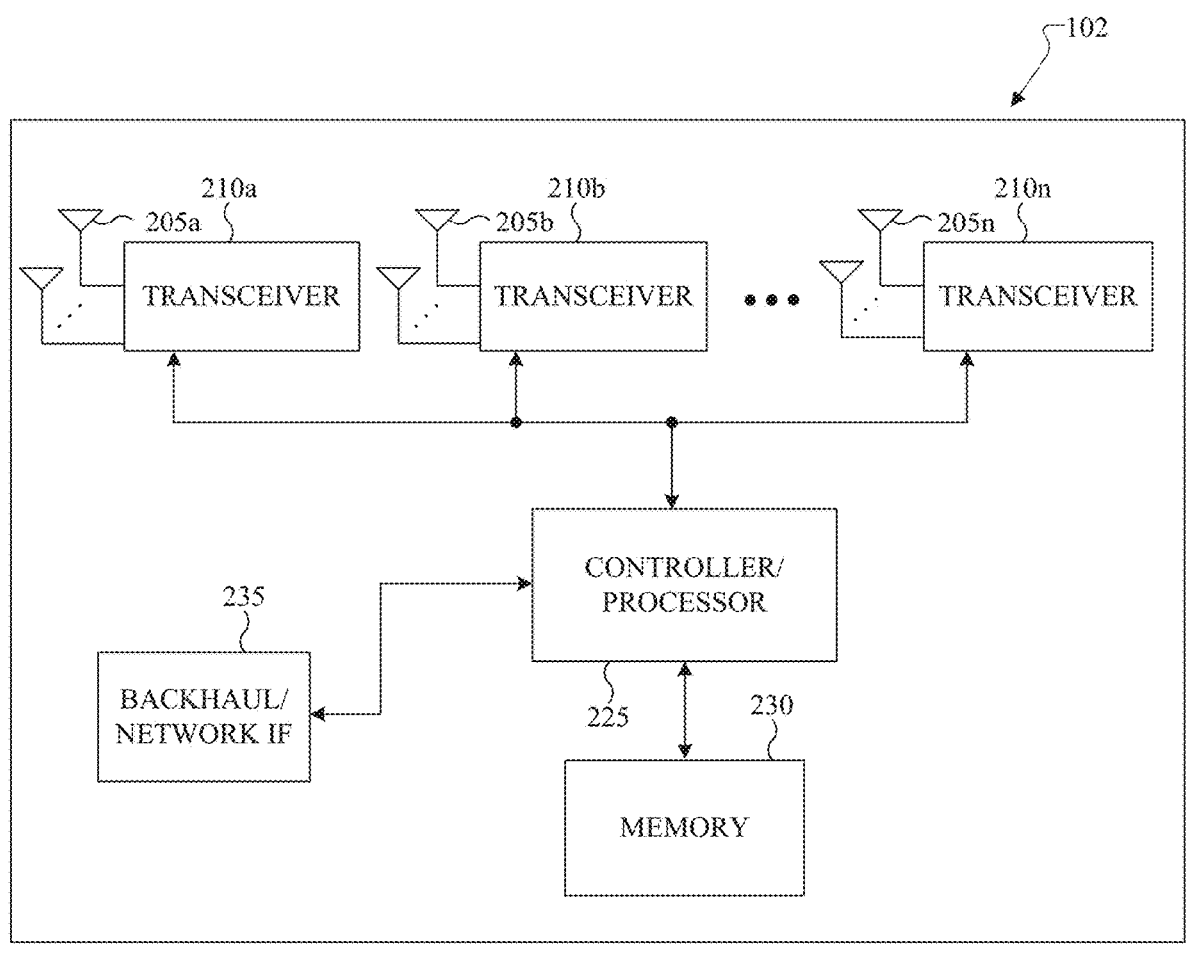
FIG. 2 illustrates an example of gNB according to embodiments of the present disclosure.
Figure 3:
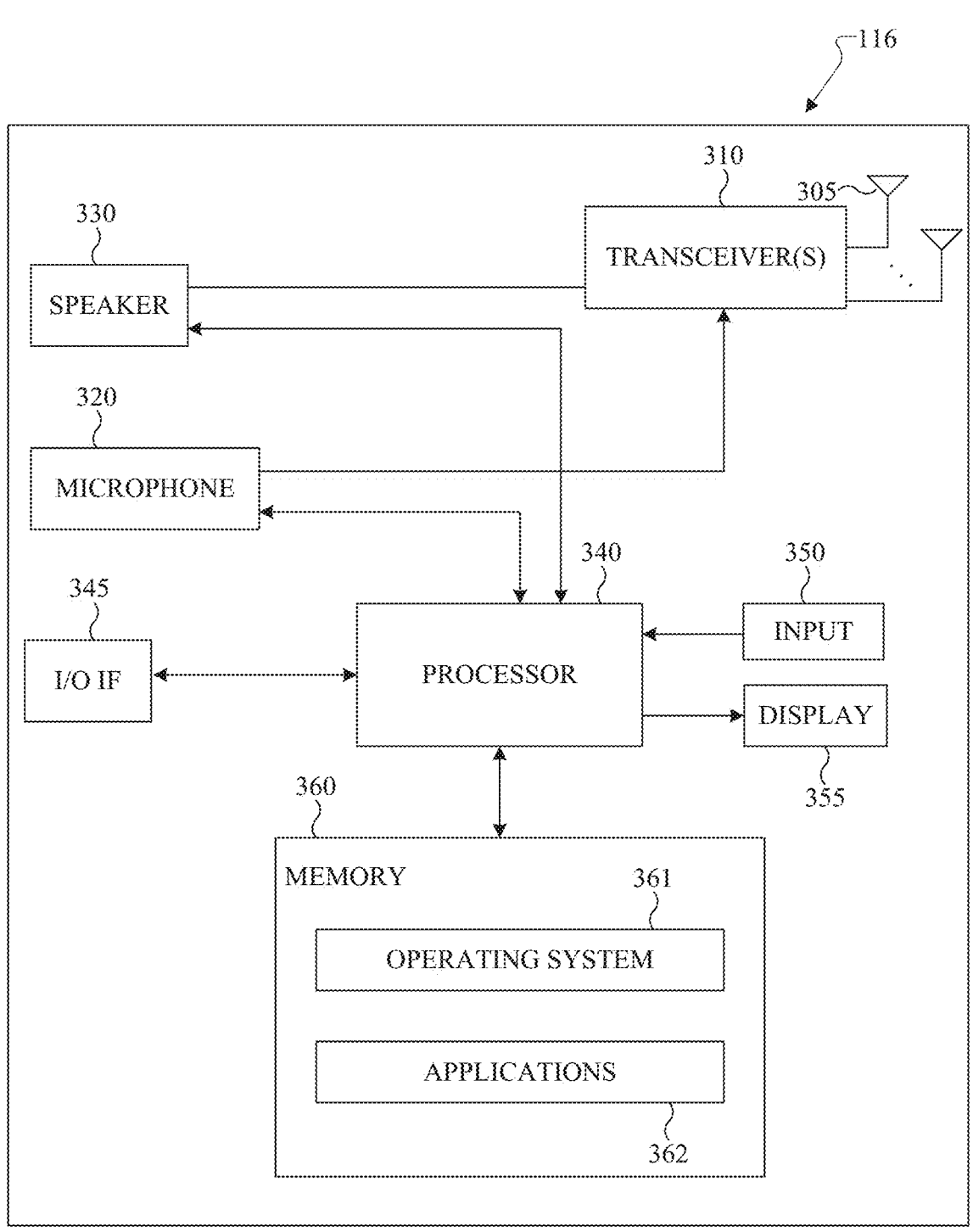
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3r d generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for identifying and/or utilizing network parameter adaptation for transmissions or receptions on one or more cells in a wireless communication system. In certain embodiments, and one or more of the gNBs 101-103 includes circuitry, programing, or a combination thereof, for providing and/or supporting network parameter adaptation on the one or more cells in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for network parameter adaptation in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for identifying and/or utilizing network parameter adaptation in a wireless communication system.

The processor 340 can move data into or out of the memory 360 as required by an executing process. In some embodiments, the processor 340 is configured to execute the applications 362 based on the OS 361 or in response to signals received from gNB s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
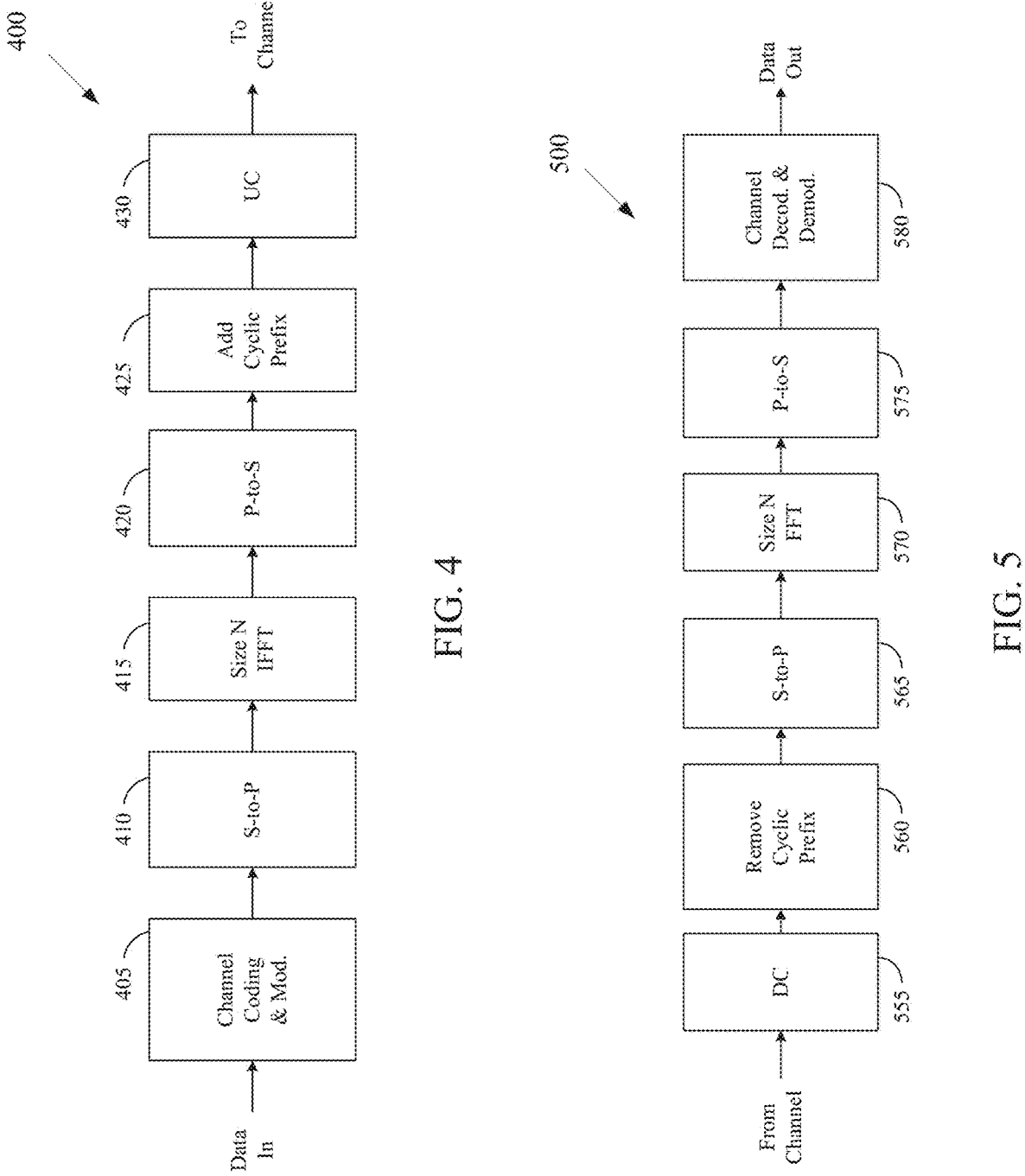
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support network parameter adaptation in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

For each DL bandwidth part (BWP) indicated to a UE in a serving cell, the UE can be provided by higher layer signaling with P≤3 control resource sets (CORESETs). For each CORESET, the UE is provided a CORESET index p, 0≤p<12, a DM-RS scrambling sequence initialization value, a precoder granularity for a number of resource element groups (REGs) in the frequency domain where the UE can assume use of a same DM-RS precoder, a number of consecutive symbols for the CORESET, a set of resource blocks (RB s) for the CORESET, control channel element (CCE)-to-REG mapping parameters, an antenna port quasi co-location, from a set of antenna port quasi co-locations, indicating quasi co-location information of the DM-RS antenna port for PDCCH reception in a respective CORE-SET, and an indication for a presence or absence of a transmission configuration indication (TCI) field for DCI format 1_1 transmitted by a PDCCH in CORESET p.

For each DL BWP configured to a UE in a serving cell, the UE is provided by higher layers with S≤10 search space sets. For each search space set from the S search space sets, the UE is provided a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s < k_s$ slots indicating a number of slots that the search space set s exists, a number of PDCCH candidates $$M_s^{(L)}$$

per CCE aggregation level L, and an indication that search space set s is either a CSS set or a USS set. When search space set s is a CSS set, the UE monitors PDCCH for detection of DCI format 2_x, where x ranges from 0 to 7 as described in TS 38.212, or for DCI formats associated with scheduling broadcast/multicast physical downlink shared channel (PDSCH) receptions, and possibly for DCI format 0_0 and DCI format 1_0.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $$n_{s,f}^{\mu}$$

in a frame with number $n_f$ if $$\left(n_f \cdot N_{slot}^{frame,\mu} + n_{s,f}^{\mu} - o_s\right) \bmod k_s = 0.$$

The UE monitors PDCCH candidates for search space set s for $T_s$ consecutive slots, starting from slot $$n_{s,f}^{\mu},$$

and does not monitor PDCCH candidates for search space set s for the next $k_s - T_s$ consecutive slots. The UE determines CCEs for monitoring PDCCH according to a search space set based on a search space equation as described in TS 38.213.

A UE is expected to monitor PDCCH candidates for up to 4 sizes of DCI formats that include up to 3 sizes of DCI formats with CRC scrambled by C-RNTI per serving cell. The UE counts a number of sizes for DCI formats per serving/scheduled cell based on a number of PDCCH candidates in respective search space sets for the corresponding active DL BWP. In the present disclosure, a constraint for the number of DCI format sizes will be referred to as DCI size limit. When the DCI size limit may be exceeded for a UE based on a configuration of DCI formats that the UE monitors PDCCH, the UE aligns the size of some DCI formats, as described in TS 38.212, so that the DCI size limit may not be exceeded.

For each scheduled cell, the UE is not required to monitor on the active DL BWP with SCS configuration $\mu$ of the scheduling cell more than $$\min(M_{PDCCH}^{max,slot,\mu}, M_{PDCCH}^{total,slot,\mu})$$

PDCCH candidates or more than $$\min(C_{PDCCH}^{max,slot,\mu}, C_{PDCCH}^{total,slot,\mu})$$

non-overlapped CCEs per slot, wherein $$M_{PDCCH}^{max,slot,\mu}$$

and $$C_{PDCCH}^{max,slot,\mu}$$

are respectively a maximum number of PDCCH candidates and non-overlapping CCEs for a scheduled cell and $$M_{PDCCH}^{total,slot,\mu}$$

and $$C_{PDCCH}^{total,slot,\mu}$$

are respectively a total number of PDCCH candidates and non-overlapping CCEs for a scheduling cell, as described in TS 38.213.

A UE may be not expected to be configured CSS sets, other than CSS sets for multicast PDSCH scheduling, that result to corresponding total, or per scheduled cell, numbers of monitored PDCCH candidates and non-overlapped CCEs per slot on the primary cell that exceed the corresponding maximum numbers per slot. For USS sets or for CSS sets associated with multicast PDSCH scheduling, when a number of PDCCH candidates or non-overlapping CCEs in a slot may exceed the aforementioned limits/maximum per slot for scheduling on the primary cell, the UE selects the USS sets or the CSS sets to monitor corresponding PDCCH in an ascending order of a corresponding search space set index until and an index of a search space set for which PDCCH monitoring may result to exceeding the maximum number of PDCCH candidates or non-overlapping CCEs per slot for scheduling on the PCell as described in TS 38.213.

For a same cell scheduling or for a cross-carrier scheduling where a scheduling cell and scheduled cells have DL BWPs with same SCS configuration $\mu$, a UE does not expect a number of PDCCH candidates, and a number of corresponding non-overlapped CCEs per slot on a secondary cell to be larger than the corresponding numbers that the UE is capable of monitoring on the secondary cell per slot. For a cross-carrier scheduling, the number of PDCCH candidates for monitoring and the number of non-overlapped CCEs per slot are separately counted for each scheduled cell.

A UE can be configured for an operation with carrier aggregation (CA) for PDSCH receptions over multiple cells (DL CA) or for PUSCH transmissions over multiple cells (UL CA). The UE can also be configured multiple transmission-reception points (TRPs) per cell via indication (or absence of indication) of a coresetPoolIndex for CORESETs where the UE receives PDCCH/PDSCH from a corresponding TRP as described in TS 38.213 and TS 38.214.

Present networks have limited capability to adapt an operation state in one or more of time/frequency/spatial/power domains. For example, in NR, there are transmissions or receptions by a serving gNB that are always expected by UEs, such as transmissions of synchronization signal/physical broadcast channel (SS/PBCH) blocks or system information or of channel state information reference signal (CSI-RS) indicated by higher layers, or receptions of physical random access channel (PRACH) or sounding reference signal (SRS) indicated by higher layers. Reconfiguration of a NW operation state involves higher layer signaling by a system information block (SIB) or by UE-specific RRC. That is a slow process and requires substantial signaling overhead, particularly for UE-specific RRC signaling.

For example, it is currently not practical or possible for a network in typical deployments to enter an energy saving state where the network does not transmit or receive due to low traffic as, in order to obtain material energy savings, the network needs to suspend transmissions or receptions for several tens of milliseconds and preferably for even longer time periods. A similar inability exists for suspending transmission or receptions for shorter time periods as a serving gNB may need to transmit SS/PBCH blocks every 5 msec and, in time division duplex (TDD) systems with UL-DL configurations having few UL symbols in a period, the serving gNB may need to receive PRACH or SRS in most UL symbols in a period.

Due to the above reasons, adaptation of a NW operation state is typically over long time periods, such as for off-peak hours when an amount of served traffic is small and for peak hours when an amount of served traffic is large. Therefore, a capability of a gNB to improve service by fast adaptation of a NW operation state to the traffic types and load, or to save energy by switching to a state that requires less energy consumption when an impact on service quality may be limited or none, is currently limited as there are no procedures for a serving gNB to perform fast adaptation of a NW operation state, with small signaling overhead, while simultaneously informing all UEs.

It is also beneficial to support a gradual transition of NW operation states between a maximum state where the NW operates at its maximum capability in one or more of a time/frequency/spatial/power domain and a minimum state where the NW operates at its minimum capability, or the NW enters a sleep mode. That may allow continuation of service while the NW transitions from a state with larger utilization of time/frequency/spatial/power resources to a state with lower utilization of such resources and the reverse as UEs can obtain time/frequency synchronization and AGC alignments, perform measurements and provide CSI reports or transmit SRS prior to scheduling of PDSCH receptions or PUSCH transmissions.

Fast information exchange between a serving gNB and UEs can be achieved by a physical layer signaling and, when a group of UEs or all UEs need to be informed, that physical layer signaling can be provided by control information that is commonly received by the UEs. Therefore, a serving gNB can utilize a PDCCH transmission to provide a DCI format with information about an adaptation of a NW operation state.

For example, in present deployments, such a DCI format is a DCI format 2_0 with information that adapts a TDD UL-DL configuration as described in TS 38.213, or a DCI format 2_1, 2_2, 2_3, 2_4, 2_6, and 2_7 with information that adapts UE transmissions or receptions as described in TS 38.213. As a UE can be configured for operation over multiple cells, such as for operation with carrier aggregation or dual connectivity, it is beneficial that a DCI format indicates NW operation states for multiple cells.

It may not be always possible for a NW to transmit PDCCHs providing a DCI format indicating NW operation states according to corresponding search space sets, for example when the NW is in a sleep state or transitions to a sleep state. To support such operation, it is beneficial for the DCI format to also indicate to UEs a next monitoring occasion for PDCCHs providing the DCI format indicating NW operation states.

There can also be cases where a UE cannot monitor PDCCH for detection of a DCI format indicating NW operation states, particularly when a periodicity of such PDCCH monitoring is long, and it may be then beneficial for a NW to also indicate NW operation states by a DCI format that a UE monitors corresponding PDCCHs according to USS sets.

Therefore, there is a need to define functionalities and procedures for adaptation of NW operation states.

There is another need to define fields of a DCI format supporting functionalities and procedures for adaptation of NW operation states.

There is another need for a DCI format to indicate multiple NW operation states and a transition among the multiple NW operation states.

There is another need for a DCI format indicating NW operation states to also indicate a next monitoring occasion for PDCCHs providing the DCI format.

There is another need to enable a UE to receive a PDCCH providing a DCI format that indicates adaptation of NW operation states.

In the present disclosure, some embodiments are provided for enabling a serving gNB to inform UEs of an adaptation to a NW operation state, such as for example for supporting network energy savings, are summarized in the following and are fully elaborated further below. A NW operation state includes one or more operation states on respective one or more groups of cells of the NW. A group of cells includes one or more cells.

In one embodiment, an indication and activation of one or more NW operation states is provided.

In one embodiment, informing transitions among NW operation states via physical layer signaling, such as by DCI provided by a PDCCH, indicating one or more NW operation state indexes, is provided.

In one embodiment, informing a time duration for an indicated NW operation state via physical layer signaling, such as by DCI provided by a PDCCH, is provided.

In one embodiment, informing a next monitoring occasion for a PDCCH that provides a DCI format indicating NW operation states is provided.

In the present disclosure, a DCI format that provides indication of NW operation states is referred to as DCI format 2_8 in this embodiment of the disclosure.

The general principle for adaptation of NW operation states by a physical layer signaling includes a serving gNB indicating to a UE a set of NW operation states by higher layer signaling, such as by a SIB or UE-specific RRC signaling, and transmitting a PDCCH that provides a DCI format (DCI format 2_8) indicating an index to the set of NW operation states for the UE to determine an update of NW operation states.

Figure 6:
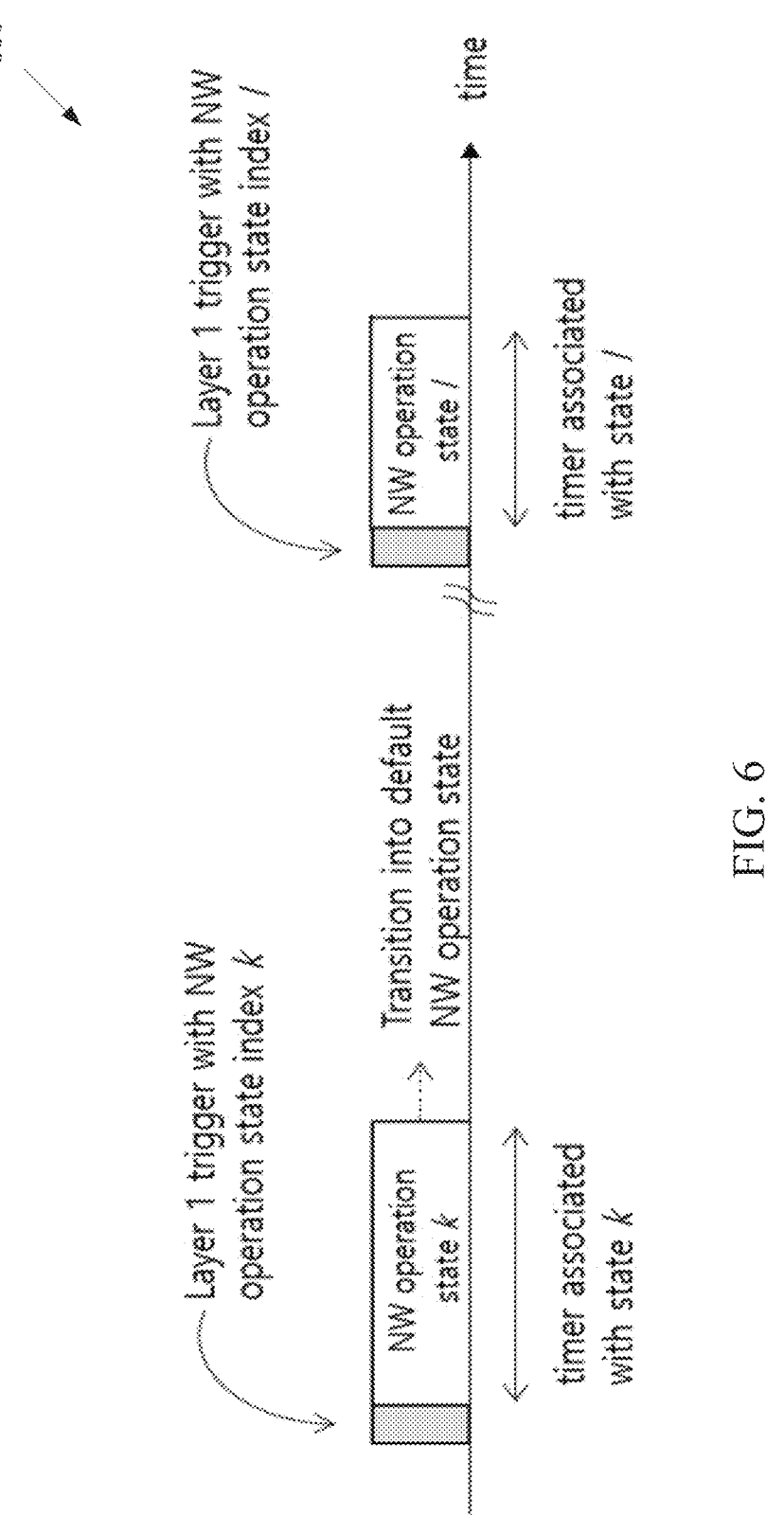
FIG. 6 illustrates example of timing diagram of NW operation state transition according to this disclosure.

FIG. 6 illustrates example of timing diagram of NW operation state transition 600 according to this disclosure. An embodiment of the timing diagram of NW operation state transition 600 shown in FIG. 6 is for illustration only.

FIG. 6 illustrates an example procedure for a NW operation state transition among different NW operation states according to the disclosure.

A NW transitions from a first NW operation state, denoted as state k, to a second NW operation state, denoted as state l. For example, each NW operation state may represent a light/mid/heavy NW energy saving (ES) mode by the NW using different ES methods and parameter configurations. A serving gNB can provide to a UE parameters for each index of a NW operation state and corresponding values for the parameters in a SIB or via UE-specific higher layer signaling. A UE can then identify a NW operation state based on an indicated value of the NW operation state index.

In one embodiment, the NW indicates to a UE a set of multiple NW operation states that can include a default state. A NW operation state can include parameters associated with transmission/reception by the network in one or more of a power, spatial, time, or frequency domain and corresponding IEs.

For example, in a power domain, a first NW operation state can be associated with a first value of parameter ss-PBCH-BlockPower providing an average energy per resource element (EPRE) with secondary synchronization signals (SSS) in dBm, and a second NW operation state can be associated with a second value of a parameter ss-PBCH-BlockPower. For example, first and second NW operation states can be respectively associated with first and second values of parameter powerControlOffsetSS that provides a power offset (in dB) of non-zero power (NZP) CSI-RS RE to SSS RE. For example, first and second NW operation states can be respectively associated with first and second values of parameter powerControlOffset that provides a power offset (in dB) of PDSCH RE to NZP CSI-RS RE.

For example, in a frequency domain, first and second NW operation states can be respectively associated with first and second values of a parameter locationAndBandwidth that indicates a frequency domain location and a bandwidth (e.g., a frequency range) for receptions or transmissions by UEs. For example, first and second NW operation states can be respectively associated with first and second values of a list of serving cells for active transmission and reception.

For example, in a spatial domain, first and second NW operation states can be respectively associated with first and second values of a parameter maxMIMO-Layers that indicates a maximum number of MIMO layers to be used for PDSCH receptions by a UE in the associated active DL BWP, or with first and second values of a parameter nrO-fAntennaPorts that indicates a number of antenna ports to be used for codebook determination for PDSCH receptions, or with first and second values of a parameter active Coreset-PoolIndex that coresetPoolIndex values for PDCCH transmissions in corresponding CORESETs and UEs can skip PDCCH receptions in a CORESET with coresetPoolIndex value that is not indicated by active CoresetPoolIndex. For example, first and second NW operation states can be respectively associated with first and second values of an antenna port subset that indicates a list of active antenna ports for CSI calculation and other associated parameters such as codebook subset restriction, rank restriction, the logical antenna size in two-dimension, number of antenna ports, and a list of CSI-RS resources, etc.

For example, in a time domain, first and second NW operation states can be respectively associated with first and second values of a parameter ssb-PeriodicityServingCell that indicates a transmission periodicity in milliseconds for SS/PBCH blocks, or with first and second values of a parameter ssb-PositionsInBurst that indicates time domain positions of SS/PBCH blocks in a SS/PBCH block transmission burst, or with first and second values of a parameter groupPresence that indicates groups of SS/PBCH blocks, such as groups of four SS/PBCH blocks with consecutive indexes, that are transmitted. For example, first and second NW operation states can be respectively associated with first and second values of a time pattern, e.g., in terms of periodicity, on-duration, start offset, etc., that indicates cell discontinuous transmission (DTX) or cell discontinuous reception (DRX).

A serving gNB can provide a UE one or more search space sets to monitor PDCCH for detection of a DCI format 2_8 that indicates NW operation states as described in the subsequent embodiments of the disclosure. The search space sets can be separate from other search space sets that the serving gNB provides to the UE or some or all search space sets can be common and the UE can monitor PDCCH for the detection of both the DCI format 2_8 that indicates NW operation states and for other DCI formats providing information for scheduling PDSCH receptions or PUSCH transmissions or SRS transmissions, or providing other control information for the UE to adjust parameters related to transmissions or receptions.

The search space sets can be CSS sets or USS sets. When the search space sets are CSS sets, a serving gNB can indicate the search space sets associated with DCI format 2_8 through higher layer signaling in a SIB or through UE-specific RRC signaling. A UE can monitor PDCCH for detection of DCI format 2_8 both in the RRC_CONNECTED state and in the RRC_INACTIVE state according to the corresponding search space sets and DRX operation may not apply for PDCCH receptions that provide DCI format 2_8.

A UE can receive PDCCHs providing DCI format 2_8 in an active DL BWP. Alternatively, a UE can receive PDCCHs providing DCI format 2_8 in an initial DL BWP that was used by all UEs to perform initial access and establish RRC connection with a serving gNB. The latter option enables a single PDCCH transmission with DCI format 2_8 from the serving gNB to all UEs because the initial DL BWP is common to all UEs, while the former option avoids a BWP switching delay because a UE receives PDCCHs providing DCI format 2_8 in the active DL BWP. It is also possible that the serving gNB indicates the DL BWP (e.g., frequency range) for PDCCH receptions that provide DCI format 2_8 through higher layer signaling, for example in a SIB.

FIG. 7 illustrates a flowchart of method 700 for a NW to indicate and activate NW operation states according to embodiments of the present disclosure. The method 700 as may be performed by a base station (e.g., 101-103 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates an example procedure for a serving gNB to indicate to UE a NW operation state according to the disclosure.

A serving gNB provides to UEs by higher layer signaling a set of NW operation states, wherein each state includes a list of NW operation parameters related to transmissions or receptions on serving cells for example in one or more of time, frequency, spatial, or power domains 710. The higher layer signaling can be via a SIB and provided, for example, by ServingCellConfigCommonSIB, or can be UE-specific RRC signaling and provided, for example, by ServingCell-ConfigCommon. The serving gNB transmits one or more PDCCHs that include respective DCI formats 2_8 indicating to UEs one or more indexes of elements in the set of NW operating states 720. An indicated NW operation state can be valid after a time from the end of the one or more PDCCHs that can be predefined in the specifications of the system operation or can be indicated by the DCI format 2_8 730.

The serving gNB can also provide to UEs by higher layer signaling a set of one or more timer values. The timer values can be in absolute time, such as milliseconds, or in a number of symbols, slots, or subframes based on a numerology/SCS of the active DL BWP or of a reference DL BWP, such as the initial DL BWP, on the primary cell or based on a reference numerology/SCS. If the set includes more than one timer values, the DCI format 2_8 can also indicate a timer value. After the timer expires before the serving gNB transmits another PDCCH with DCI format 2_8 to indicate another NW operation state, the NW operation state becomes a default one that can be provided by higher layer signaling, or becomes a predetermined state from the set of NW operation states such as the first state or the last state.

In various embodiments, determined network operation parameters for transmission or receptions on one or more cells may be applied after an application delay time from an end of a reception time of the PDCCH providing the DCI format, where the application delay time is predefined or indicated by the DCI format.

FIG. 8 illustrates a flowchart of method 800 for UE to receive and activate NW operation states according to embodiments of the present disclosure. The method 800 as may be performed by a UE (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates an example procedure for a UE to obtain an indication of NW operation states from a DCI format according to the disclosure.

A UE is provided from a serving gNB by higher layer signaling a set of NW operation states, wherein each state includes a list of NW operation parameters related to transmissions or receptions on serving cells or TRPs for example in one or more of time, frequency, spatial, or power domains 810. The higher layer signaling can be a SIB and be provided, for example, by ServingCellConfigCommonSIB, or can be UE-specific RRC signaling and be provided, for example, by ServingCellConfigCommon. The UE receives one or more PDCCHs that include respective DCI formats 2_8 indicating indexes of elements of the set of NW operating states 820. The UE operates according to a first of the indicated NW operation states after a time from the end of the one or more PDCCHs that can be predefined in the specifications of the system operation or can also be indicated by DCI format 2_8 830.

The UE can also be provided by higher layer signaling from the serving gNB a set of one or more timer values that can be in absolute time, such as milliseconds, or in a number of symbols, slots, or subframes based on a numerology/SCS of the active DL BWP or of a reference DL BWP such as the initial DL BWP, on the primary cell, or based on a reference numerology/SCS such as 15 kHz. If the set of timer values includes more than one timer value, the DCI format 2_8 can also indicate the timer value. If the UE does not receive another PDCCH with DCI format 2_8 that indicates another NW operation state and the timer expires, the UE can assume operation according to a NW operation state that can be a default one that is provided by higher layer signaling, or can be a predetermined state from the set of NW operation states such as the first state or the last state.

Figure 9:
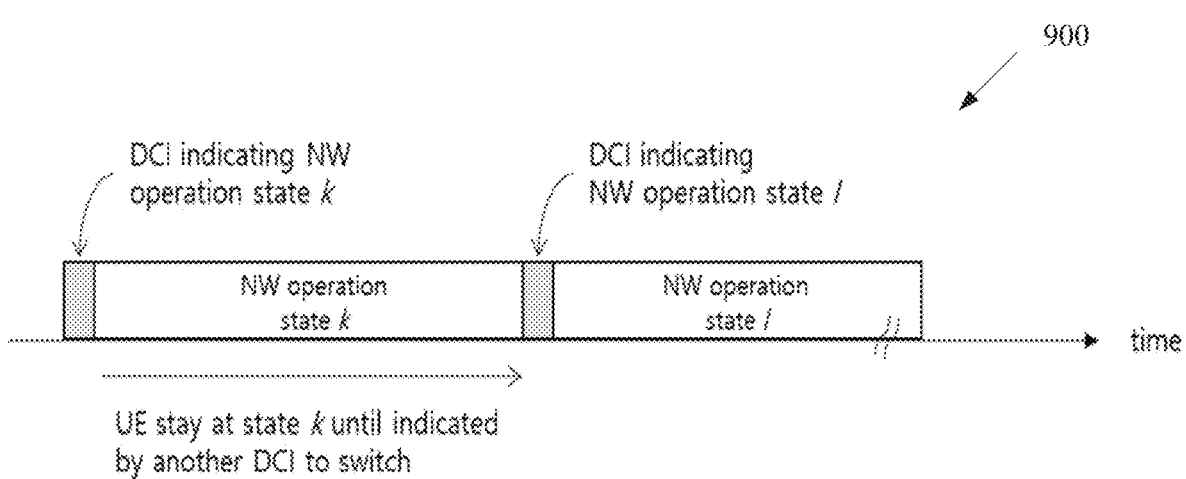
FIG. 9 illustrates example of timing diagram of NW operation state transition according to this disclosure.

FIG. 9 illustrates example of timing diagram of NW operation state transition 900 according to this disclosure. An embodiment of the timing diagram of NW operation state transition 900 shown in FIG. 9 is for illustration only.

Figure 10:
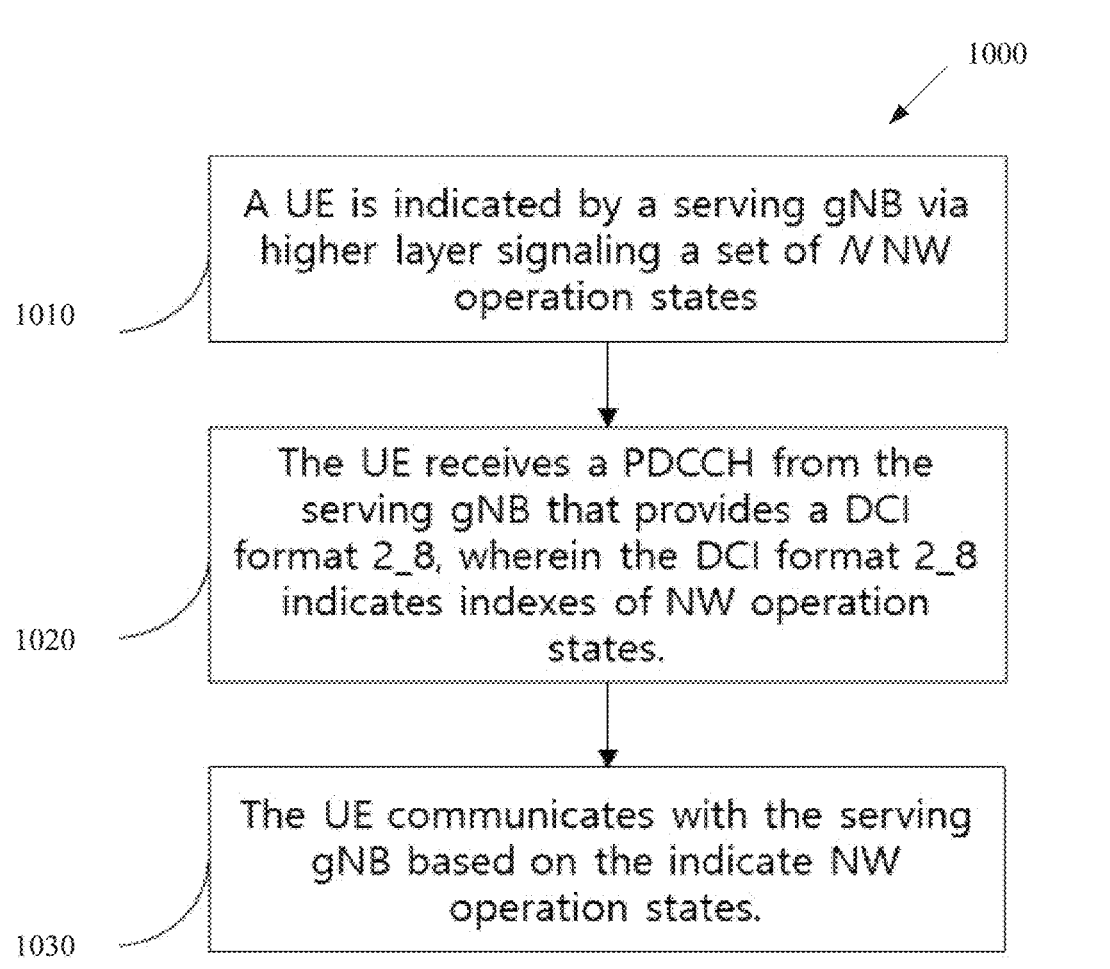
FIG. 10 illustrates a flowchart of UE method for NW operation state switching via DCI indicating NW operation state index according to embodiments of the present disclosure.

FIG. 10 illustrates a flowchart of UE method 1000 for NW operation state switching via DCI indicating NW operation state index according to embodiments of the present disclosure. The method 1000 as may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIGS. 9 and 10 illustrate example diagram of NW operation state switching via DCI indicating NW operation state index. FIG. 10 illustrates an example procedure for a NW to provide and for a UE to obtain an indication of NW operation states according to the disclosure.

A UE is indicated by a serving gNB via higher layer signaling a set of N NW operation states 1010. Each NW operation state includes a list of parameters for the NW operation in one or more of the aforementioned domains. The UE receives a PDCCH from the serving gNB that provides a DCI format 2_8, wherein the DCI format 2_8 indicates indexes of NW operation states using a field of ceil(log₂(N)) bits for each state 1020. The UE communicates with the serving gNB based on the indicated NW operation states 1030.

In one example, when the UE does not correctly receive the DCI format 2_8, the UE continues to communicate with the serving gNB according to a current NW operation state.

In another example, the UE communicate with the serving gNB according to a default NW operation state that can be defined in the specifications of the system operation, or can be separately provided by higher layers, or can be specified to be a first state or a last state in the set of NW operation states.

In another example, each state is associated with a timer value. The timer value can be predetermined in the specifications of the system operation or the serving gNB can indicate to a UE via higher layer signaling a set of one or more timer values. When the set includes more than one timer values, the DCI format can include a second field with a value that indicates an index from the set of timer values for the UE to use the timer value associated with the index. The UE is expected to communicate with the serving gNB according to a default NW operation state, as described in the previous paragraph, when the timer expires prior to the UE receiving another DCI format 2_8 that indicates a new NW operation state. A UE resets the timer value when a UE correctly decodes a DCI format 2_8 indicating a NW operation state.

A PDCCH providing a DCI format 2_8 that indicates NW operation states typically needs to be received by all UEs having a same serving gNB as all such UEs may need to communicate with the serving gNB according to the indicated NW operation states. Therefore, a UE can be provided one or more CSS sets to monitor PDCCH candidates associated with DCI format 2_8.

A set of NW operation states is not expected to include a large number of states, for example, a size of the set is not expected to be larger than 8 or 16, as a NW has limited domains to adapt its operation and as multiple domains can also be combined in one state. Therefore, a corresponding field in DCI format 2_8 for indicating a NW operation state, by indicating an index in the set of NW operation states, is not expected to require a large number of bits, for example the field may not require more than 3 or 4 bits. Considering that a number of CRC bits for a DCI format is 24, that a polar code requires a minimum payload larger than 4 bits, such as 12 bits, that coding gains from polar coding increase as the payload increases, and that DCI format 2_8 may need to have same size with other DCI formats that the UE monitors associated PDCCH candidates for respective search space sets, the number of bits of DCI format 2_8 may need to be in the tens of bits, such as 30 or more bits, excluding CRC bits. It is therefore possible and beneficial to provide indications for more than one NW operation states by a same DCI format 2_8.

In the present disclosures, DCI format 2_8 that provides a series of NW operation states is provided, for example to support a gradual transition using intermediate states from a maximal operation state, where all/most time/frequency/spatial/power resources are used by the serving gNB to communicate with UEs to a minimal state where the gNB uses minimal or no time/frequency/spatial/power resources to communicate with UEs, or the reverse where the serving gNB transitions from a minimal state to a maximal state using steps of intermediate states.

For example, the serving gNB can first reduce time or spatial resources and then proceed to reduce power or frequency resources, or the serving gNB can first increase time or power resources and then proceed to increase frequency or spatial resources. To avoid a PDCCH transmission with DCI format 2_8 each time a NW operation transitions from one state to another, avoid restrictions associated with a serving gNB managing PDCCH monitoring for detection of DCI format 2_8 at a same time for UEs while having different DRX cycles for the UEs, and also avoid a UE power consumption increase from having UEs without data to transmit or receive having to exit a sleep state in order to monitor PDCCH for detection of DCI format 2_8, the DCI format 2_8 can indicate a series of NW operation states.

Each NW operation state can be associated with a timer for its validity, prior to transitioning to a next NW operation state. As previously described, the timer for a NW operation state can be provided by higher layers and can be additionally indicated by DCI format 2_8 and, in such case, DCI format 2_8 also includes fields indicating a series of timers for the corresponding series of NW operation states. A field for a timer can be located adjacent to a field indicating a NW operation state or the fields for the timers can be located after the fields for the NW operation states and have a same order in DCI format 2_8 to determine a corresponding mapping.

Figure 11:
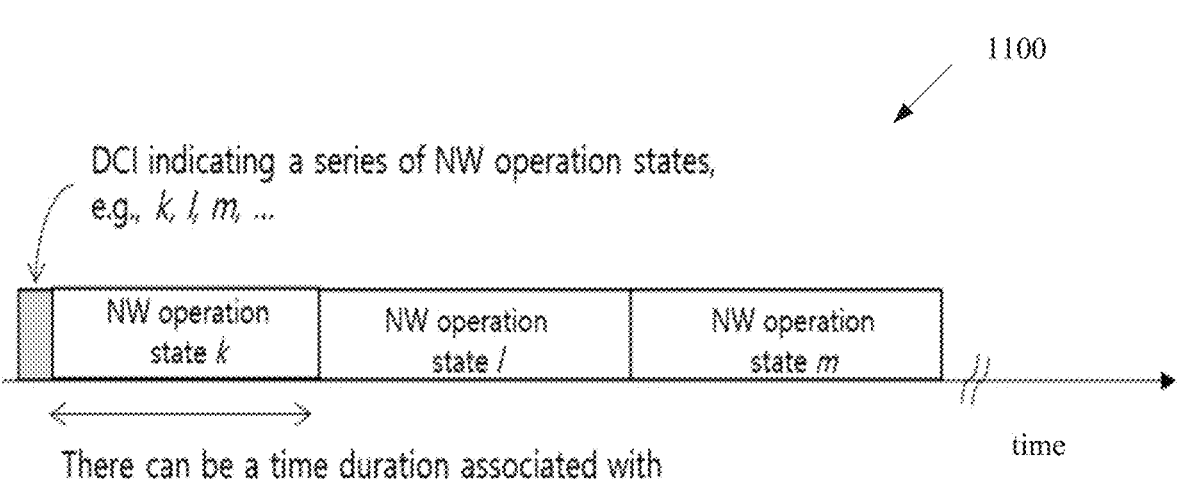
FIG. 11 illustrates example of timing diagram of a series of NW operation state transitions according to this disclosure.

FIG. 11 illustrates example of timing diagram of a series of NW operation state transitions 1100 according to this disclosure. An embodiment of the timing diagram of NW operation state transition 1100 shown in FIG. 11 is for illustration only.

Figure 12:
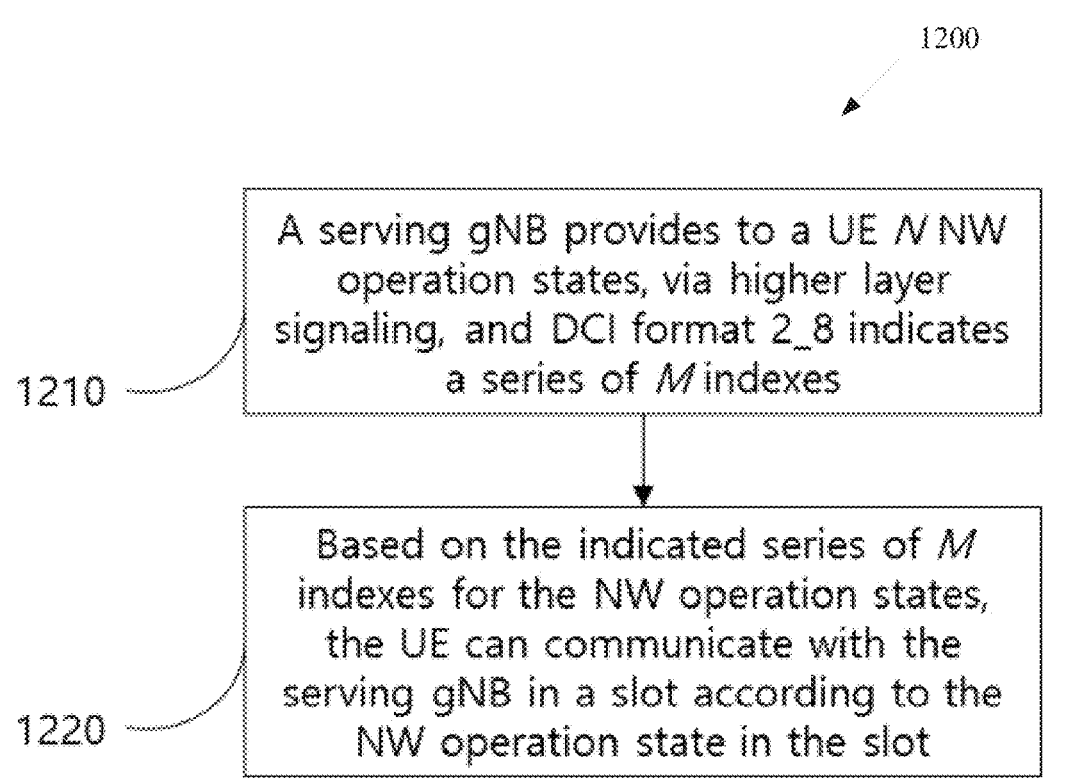
FIG. 12 illustrates a flowchart of method for a DCI format indicating a series of NW operation state according to embodiments of the present disclosure.

FIG. 12 illustrates a flowchart of method 1200 for a DCI format indicating a series of NW operation state according to embodiments of the present disclosure. The method 1200 as may be performed by a UE (e.g., 111-116 as illustrated in FIG. 1) and a base station (e.g., 101-103 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

FIGS. 11 and 12 illustrate example diagram of a series of NW operation state transitions via DCI indicating a series of NW operation state indexes.

FIG. 12 illustrates an example procedure for a NW to provide and a UE to obtain via a DCI format an indication for a series of NW operation states according to the disclosure.

A serving gNB provides to a UE N NW operation states, via higher layer signaling as previously described, and DCI format 2_8 indicates a series of M indexes using a field with $M*ceil(log_2(N))$ bits or, equivalently, M fields of $ceil(log_2(N))$ bits 1210. A value of M can be provided by higher layer signaling. In an alternative, a field in DCI format 2_8 can indicate the value of M and the UE can interpret remaining bits in the DCI format 2_8 based on the indicated value of M. In that case, to avoid an ambiguity in the interpretation of DCI format 2_8, a field of $log_2(M_{max})$ bits can be located prior to a field, or fields, of a total of $M*ceil(log_2(N))$ bits that indicate a series of NW operation states, or of fields that indicate a respective series of timers for the indicated NW operation states. $M_{max}$ is a maximum number of indicated states and a value of $M_{max}$ can be indicated by higher layers or be defined in the specifications of the system operation.

In that manner, although contents of DCI format 2_8 are variable and determined based on the value of the field of $log_2(M_{max})$ bits, the location and size of the field of $log_2(M_{max})$ bits is fixed at the beginning of DCI format 2_8. Also, a size of DCI format 2_8 can remain fixed as, depending on the value of M, padding bits of zero value or additional fields providing other functionalities can be included in order to utilize remaining $(M_{max}-M)*ceil(log_2(N))$ bits. Based on the indicated series of M indexes for the NW operation states, the UE can communicate with the serving gNB in a slot according to the NW operation state in the slot 1220.

An indicated state can be valid for a time duration that is indicated by higher layers, or a set of time durations can be indicated by higher layers per NW operation state or commonly to all NW operation states, and a field, or fields, in DCI format 2_8 can indicate a time duration for each NW operation state in the series of M states. For example, for a set of time durations with size L for a NW operation state, a field or fields with a total of $M*ceil(log_2(L))$ bits in DCI format 2_8 indicate a time duration for each state from the series of M states.

In one example, if a UE reaches a last state indicated in the series of M states, after a specified or indicated time duration elapses without the UE receiving another DCI format 2_8 indicating another series of NW operation states, the UE transitions to a default NW operation state that can be determined as previously described. The UE determines a series of NW operation states based on a corresponding indication of a last DCI format 2_8 that the UE receives. A last DCI format 2_8 is provided by a PDCCH reception that provides DCI format 2_8 and ends after other PDCCH receptions that provide DCI format 2_8.

A serving gNB may not transmit a PDCCH to provide DCI format 2_8, for example in order to reduce signaling overhead or because it can be beneficial for the serving gNB to transition to a dormant state to save energy prior to a PDCCH monitoring occasion for DCI format 2_8, for example when there are no UEs with traffic for the serving gNB to communicate with. Also, it may not be possible to ensure that all UEs associated with the serving gNB can receive DCI format 2_8 when the serving gNB transmits an associated PDCCH, for example because it may not be possible to ensure that all UEs correctly receive DCI format 2_8. For such cases, a default UE operation needs to be defined.

FIG. 13 illustrates example of timing diagram of NW operation state transition 1300 according to this disclosure. An embodiment of the timing diagram of NW operation state transition 1300 shown in FIG. 13 is for illustration only.

FIG. 14 illustrates a flowchart of UE method 1400 for a NW operation state transition based on a timer according to embodiments of the present disclosure. The method 1400 as may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

FIGS. 13 and 14 illustrate a NW operation state transition based on a timer.

FIG. 14 illustrates a NW operation state transition based on a timer according to the disclosure.

A UE receives from a serving gNB a PDCCH that provides DCI format 2_8 indicating NW operation states and can also include respective timer values (NW operation state validity duration) 1410. A set of one or more timer values can be predefined or provided by the serving gNB to the UE by a higher layer signaling. For a set of L timer values and a set of NW operation states of N states, DCI format 2_8 can indicate an index for a timer value from the set of timer values and an index for a NW operation state from the set of NW operation states using $ceil(log_2(N))+ceil(log_2(Y))$ bits. The UE resets the timer value when the UE correctly receives a DCI format 2_8. Upon expiration of the timer, the UE communicates with a serving gNB according to a predetermined NW operation state 1420. The predetermined NW operation state can be defined in the specifications of the system operation, or separately indicated by higher layers, or indicated by DCI format 2_8. For example, the UE can communicate with the serving gNB according to a default state, such as the first or last NW operation state in the set of states. If the set of timer values includes a single value, DCI format 2_8 does not include a field to indicate a timer value for an indicated NW operation state.

PDCCH monitoring occasions for detection of a DCI format are determined according to search space sets that include the DCI format as one of the parameters of the search space sets. That enables a common understanding between a UE and a serving gNB of the PDCCH monitoring occasions so that the serving gNB knows that when the serving gNB transmits a PDCCH, the UE may receive the PDCCH and decode the DCI format provided by the PDCCH. For adaptation of a NW operation state, a predictability of PDCCH transmission providing DCI format 2_8 by a serving gNB may not always exist, for example when the NW operation state changes to a low energy state without transmissions from the gNB for a time period that is longer than a periodicity for PDCCH monitoring for detection of DCI format 2_8 according to the search space sets. In such cases, to avoid unnecessary UE power consumption associated with receiving PDCCHs and decoding for detection of DCI format 2_8, the DCI format 2_8 can include a field indicating when a next PDCCH reception providing DCI format 2_8 may be.

For example, the indication can be for an integer multiple of the least common multiple of the periodicities associated with the search space sets so that when a UE fails to detect DCI format 2_8 indicating when a next PDCCH reception providing DCI format 2_8 may be, the penalty may be some unnecessary PDCCH receptions while the UE can be ensured in that manner to receive a next PDCCH with DCI format 2_8 that may be transmitted by the serving gNB.

A field in DCI format 2_8 that indicates a next PDCCH monitoring occasion for detection of DCI format 2_8 can be included in DCI format 2_8 based on a separate indication by higher layers as part of the information indicating the fields of DCI format 2_8. A minimum value can correspond to a smallest periodicity among the search space sets associated with DCI format 2_8 or can be indicated by higher layers. Other values can be indicated by higher layers via a SIB or via UE-specific RRC signaling. A second approach for indicating a next PDCCH monitoring occasion for detection of DCI format 2_8 is for a serving gNB to inform UEs of an association among indicated NW operation state and next PDCCH monitoring occasion for detection of DCI format 2_8.

Then, when a UE determines the NW operation state, the UE can also determine the next PDCCH monitoring occasion. If a UE fails to correctly decode DCI format 2_8, the UE can still receive a next PDCCH providing DCI format 2_8 as previously described (in such case, the UE may unnecessarily receive some PDCCHs according to search space sets associated with DCI format 2_8 prior to the next PDCCH that actually provides DCI format 2_8). A tradeoff between the two approaches is the overhead reduction in the DCI format 2_8 with the second approach at the expense of reduced flexibility for the serving gNB to indicate a preferred time for the next PDCCH monitoring occasion. A duration for PDCCH monitoring at the next PDCCH monitoring occasion can be as determined from respective search space sets or can also be indicated by DCI format 2_8. The indicated time for a next PDCCH monitoring occasions for DCI format 2_8 can be in terms of slots for the BWP of PDCCH receptions, or in terms of slots for a reference numerology/SCS, such as 15 kHz SCS, or in term of absolute time such as milliseconds.

Figure 15:
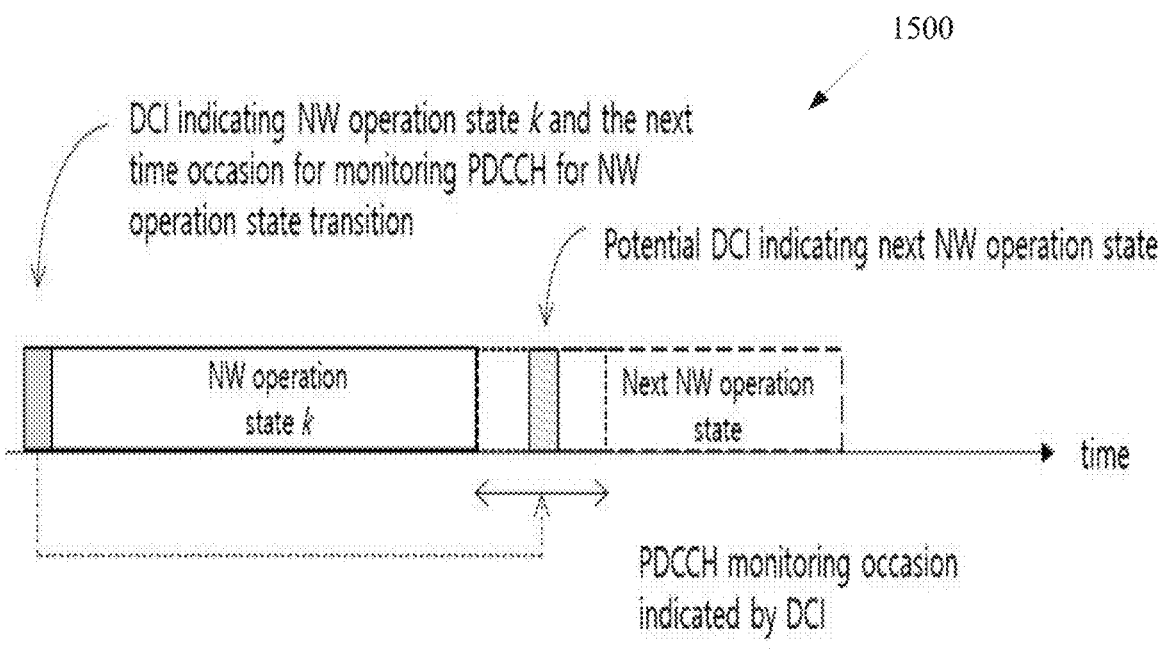
FIG. 15 illustrates example of timing diagram of next PDCCH monitoring occasion indication and NW operation state transition according to the indication received in the indicated next PDCCH monitoring occasion according to this disclosure.

FIG. 15 illustrates example of timing diagram of next PDCCH monitoring occasion indication and NW operation state transition according to the indication received in the indicated next PDCCH monitoring occasion 1500 according to this disclosure. An embodiment of the timing diagram of NW operation state transition 1500 shown in FIG. 15 is for illustration only.

Figure 16:
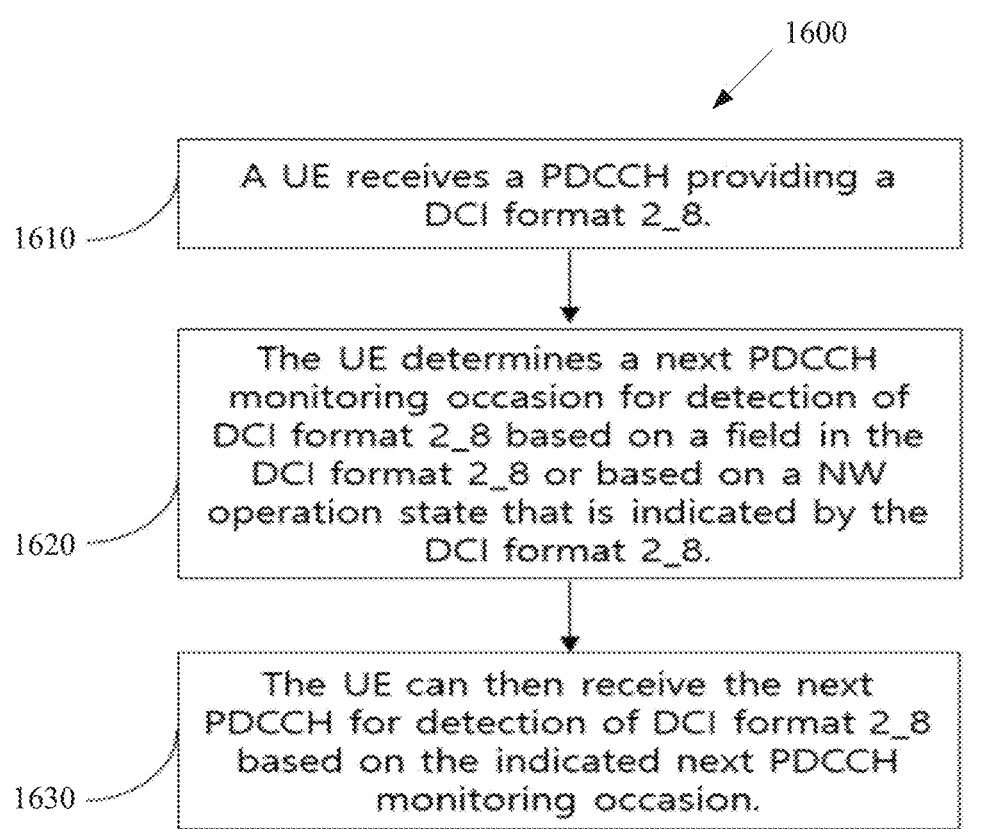
FIG. 16 illustrates a flowchart of method for an indication by DCI format of NW operation state and next PDCCH monitoring occasion for the DCI format according to embodiments of the present disclosure.

FIG. 16 illustrates a flowchart of UE method 1600 for an indication by DCI format of NW operation state and next PDCCH monitoring occasion for the DCI format according to embodiments of the present disclosure. The method 1600 as may be performed by a UE (e.g., 111-116 as illustrated in FIG. 1). An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

FIGS. 15 and 16 illustrate an indication by DCI format of NW operation state and next PDCCH monitoring occasion for the DCI format.

FIG. 15 illustrates a method for a serving gNB to indicate and for a UE to determine a next PDCCH monitoring occasion according to the disclosure.

A UE receives a PDCCH providing a DCI format 2_8 1510. The UE determines a next PDCCH monitoring occasion for detection of DCI format 2_8 based on an indication by a field in the DCI format 2_8 or based on a NW operation state that is indicated by the DCI format 2_8 1520. When the next PDCCH monitoring occasion is based on the field, the serving gNB also informs the UE in advance by higher layer signaling of a mapping among values of the field and values for a time period until the next PDCCH monitoring occasion. The granularity for the time period can be a smallest or largest periodicity value among the search space sets associated with DCI format 2_8, or can also be indicated by higher layers in terms of a number of slots of a reference numerology/SCS or in terms of absolute time such as milliseconds.

When the next PDCCH monitoring occasion is based on an association with the indicated NW operation state, the serving gNB also informs the UE of the association, for example through a SIB or through UE-specific RRC signaling, and the granularity can be same as in case the next PDCCH monitoring occasion is indicated by a field in DCI format 2_8. The UE can then receive the next PDCCH for detection of DCI format 2_8 based on the indicated next PDCCH monitoring occasion 1530.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE), the method comprising:
receiving:
first information related to operation states on a cell, wherein a first operation state from the operation states includes first parameters associated with transmissions of channels or signals on the cell in one or more of a power, spatial, time, or frequency domain,
second information related to a search space set to receive physical downlink control channels (PDCCHs), wherein a PDCCH from the PDCCHs provides a downlink control information (DCI) format that indicates one or more of the operation states, and
the PDCCH;
determining parameters in the one or more of power, spatial, time, or frequency domain, based on the one or more operation states indicated by the DCI format; and
receiving the channels or signals on the cell based on the parameters.

2. The method of claim 1, wherein the parameters include at least one of:
a power,
a number of antenna ports,
a frequency range, and
a time duration.

3. The method of claim 1, further comprising:
receiving:
third information related to a first bandwidth part (BWP), and
fourth information related to a second BWP, wherein:
receptions of the PDCCH are within the first BWP, and
receptions prior to the receptions of the PDCCH are within the second BWP.

4. The method of claim 1, wherein:
the determined parameters apply after an application delay time from an end of a reception time of the PDCCH providing the DCI format, and
the application delay time is predefined or indicated by the DCI format.

5. The method of claim 1, further comprising:
receiving:
third information related to one or more timer values, and
fourth information related to a second operation state, wherein the DCI format indicates a third operation state and a timer value associated with the third operation state,
wherein determining the parameters further comprises determining the parameters based on:
the second operation state prior to expiration of the timer value, and
the third operation state after the expiration of the timer value.

6. The method of claim 1, wherein:
the DCI format provides a series of M operation states and corresponding M timer values,
an operation state from the series of M operation states is applicable for a time duration indicated by a corresponding timer value, and
the parameters are determined consecutively based on the series of M operation states and the corresponding M timer values.

7. The method of claim 1, further comprising:
determining occasions for subsequent PDCCH receptions based on an indication by the DCI format, wherein the indication is for a subset of occasions for PDCCH receptions associated with the search space set over a duration; and
receiving the subsequent PDCCHs in the determined occasions.

8. A user equipment (UE) comprising:
a transceiver configured to receive:
first information related to operation states on a cell, wherein a first operation state from the operation states includes first parameters associated with transmissions of channels or signals on the cell in one or more of a power, spatial, time, or frequency domain,
second information related to a search space set to receive physical downlink control channels (PDCCHs), wherein a PDCCH from the PDCCHs provides a downlink control information (DCI) format that indicates one or more of the operation states, and
the PDCCH; and
a processor operably coupled to the transceiver, the processor configured to determine parameters for the one or more operation states indicated by the DCI format,
wherein the transceiver is further configured to receive the channels or signals on the cell based on the parameters.

9. The UE of claim 8, wherein the parameters include at least one of:
a power,
a number of antenna ports,
a frequency range, and
a time duration.

10. The UE of claim 8, wherein:
the transceiver is further configured to receive:
third information related to a first bandwidth part (BWP), and
fourth information related to a second BWP,
receptions of the PDCCH are within the first BWP, and
receptions prior to the receptions of the PDCCH are within the second BWP.

11. The UE of claim 8, wherein:
the determined parameters apply after an application delay time from an end of a reception time of the PDCCH providing the DCI format, and
the application delay time is predefined or indicated by the DCI format.

12. The UE of claim 8, wherein:
the transceiver is further configured to receive:
third information related to one or more timer values, and
fourth information related to a second operation state,
the DCI format indicates a third operation state and a timer value associated with the third operation state, and the processor is further configured to determine the parameters based on:

the second operation state prior to expiration of the timer value, and the third operation state after expiration of the timer value.

13. The UE of claim 8, wherein:

the DCI format provides a series of M operation states and corresponding M timer values, an operation state from the series of M operation states is applicable for a time duration indicated by a corresponding timer value, and the parameters are determined consecutively based on the series of M operation states and the corresponding M timer values.

14. The UE of claim 8, wherein:

the processor is further configured to determine occasions for subsequent PDCCH receptions based on an indication by the DCI format, the indication is for a subset of occasions for PDCCH receptions associated with the search space set over a duration, and the transceiver is further configured to receive the subsequent PDCCHs in the determined occasions.

15. A base station comprising:

a transceiver configured to transmit:

first information related to operation states on a cell, wherein a first operation state from the operation states includes first parameters associated with transmissions of channels or signals on the cell in one or more of a power, spatial, time, or frequency domain, second information related to a search space set to receive physical downlink control channels (PDCCHs), wherein a PDCCH from the PDCCHs provides a downlink control information (DCI) format that indicates one or more of the operation states, and the PDCCH; and a processor operably coupled to the transceiver, the processor configured to determine parameters for the one or more of the operation states, wherein the transceiver is further configured to transmit:

the channels or signals on the cell based on the parameters for the one or more operation states.

16. The base station of claim 15, wherein the parameters include at least one of:

a power, a number of antenna ports, a frequency range, and a time duration.

17. The base station of claim 15, wherein:

the transceiver is further configured to transmit:

third information related to a first bandwidth part (BWP), and fourth information related to a second BWP, transmissions of the PDCCH are within the first BWP, and transmissions prior to the transmissions of the PDCCH are within the second BWP.

18. The base station of claim 15, wherein:

the transceiver is further configured to transmit:

third information related to one or more timer values, and fourth information related to a second operation state:

the DCI format indicates a third operation state and a timer value associated with the third operation state, the channels or signals are associated with the second operation state prior to expiration of the timer value, and the channels or signals are associated with the third operation state after expiration of the timer value.

19. The base station of claim 15, wherein:

the DCI format provides a series of M operation states and corresponding M timer values, an operation state from the series of M network operation states is applicable for a time duration indicated by a corresponding timer value, and the transceiver is further configured to transmit the channels or signals on the cell using the parameters based on the series of M operation states and the corresponding M timer values.

20. The base station of claim 15, wherein the DCI format further indicates:

an application delay time of the parameters from an end of a reception time of the PDCCH providing the DCI format, and occasions for subsequent PDCCH transmissions, wherein the indicated application delay time is for a subset of occasions for PDCCH transmissions associated with the search space set over a duration.

* * * * *